United States Patent
Cattani et al.

(10) Patent No.: US 12,256,201 B2
(45) Date of Patent: Mar. 18, 2025

(54) MICROPHONE UNIT, MICROPHONE META-ARRAY AND NETWORK WITH MICROPHONE META-ARRAY

(71) Applicant: ASK INDUSTRIES SOCIETA' PER AZIONI, Monte San Vito (IT)

(72) Inventors: Luca Cattani, Scandiano (IT); Angelo Farina, Parma (IT); Daniel Pinardi, Parma (IT); Tiziano Nili, Reggio Emilia (IT); Andrea Toscani, Salsomaggiore Terme (IT)

( * ) Notice: Subject to any disclaimer, the term of this patent is extended or adjusted under 35 U.S.C. 154(b) by 237 days.

(21) Appl. No.: 18/044,292

(22) PCT Filed: Oct. 4, 2021

(86) PCT No.: PCT/EP2021/077233
§ 371 (c)(1),
(2) Date: Mar. 7, 2023

(87) PCT Pub. No.: WO2022/078791
PCT Pub. Date: Apr. 21, 2022

(65) Prior Publication Data
US 2023/0328430 A1   Oct. 12, 2023

(30) Foreign Application Priority Data
Oct. 13, 2020   (IT) .................. 102020000024052

(51) Int. Cl.
*H04R 3/00*   (2006.01)
*G06F 3/16*   (2006.01)
(Continued)

(52) U.S. Cl.
CPC ............ *H04R 3/005* (2013.01); *G06F 3/165* (2013.01); *H04R 1/406* (2013.01); *H04R 19/04* (2013.01);
(Continued)

(58) Field of Classification Search
CPC ........ H04R 3/005; H04R 1/406; H04R 19/04; H04R 2201/003; H04R 2201/401; H04R 2499/13; G06F 3/165
(Continued)

(56) References Cited

U.S. PATENT DOCUMENTS

2015/0365754 A1* 12/2015 Perl .................... H04R 1/08
381/86
2017/0308352 A1* 10/2017 Kessler .............. H04R 3/005
(Continued)

FOREIGN PATENT DOCUMENTS

CN    210518820 U    5/2020
CN    210958793 U    7/2020
(Continued)

OTHER PUBLICATIONS

International Search Report for corresponding PCT/EP2021/077233 dated Jan. 18, 2022.
(Continued)

*Primary Examiner* — William A Jerez Lora
(74) *Attorney, Agent, or Firm* — Egbert, McDaniel & Swartz, PLLC

(57) ABSTRACT

A microphone unit having only one PCB, a plurality of transducers of acoustic-electric type with digital output mounted on a back side of the PCB, through holes obtained in the PCB in correspondence with each transducer, an A2B audio interface mounted on the back side of the PCB and electrically connected to the transducers; and input/output electrical connectors mounted on the back side of the PCB and electrically connected to said A2B audio interface; the plurality of transducers include a central transducer and at least three peripheral transducers disposed at the same radial distance from the central transducer and equally angularly (Continued)

spaced. A microphone meta-array includes a plurality of microphone units connected by one or more A2b networks.

11 Claims, 7 Drawing Sheets

(51) Int. Cl.
*H04R 1/40* (2006.01)
*H04R 19/04* (2006.01)

(52) U.S. Cl.
CPC .. *H04R 2201/003* (2013.01); *H04R 2201/401* (2013.01); *H04R 2499/13* (2013.01)

(58) Field of Classification Search
USPC .............................................. 381/86, 91, 122
See application file for complete search history.

(56) References Cited

U.S. PATENT DOCUMENTS

| 2018/0227666 | A1* | 8/2018 | Barnett | ................. | H04R 3/005 |
| 2019/0379969 | A1 | 12/2019 | Fontana et al. | | |
| 2021/0211156 | A1* | 7/2021 | Kessler | ................. | H04B 1/713 |

FOREIGN PATENT DOCUMENTS

| DE | 102013019194 A1 | 5/2015 |
| GB | 2545359 A | 6/2017 |
| JP | S6172500 A | 4/1986 |
| KR | 101403372 B1 | 6/2014 |

OTHER PUBLICATIONS

Written Opinion of the International Searching Authority for corresponding PCT/EP2021/077233 dated Jan. 18, 2022.

* cited by examiner

MICROPHONE UNIT, MICROPHONE META-ARRAY AND NETWORK WITH MICROPHONE META-ARRAY

The present invention relates to the field of acoustic engineering and in particular to a microphone unit having at least four microphone capsules, to a microphone array (hereinafter "meta-array") obtained by connecting said microphone units, and to a network comprising one or more microphone units and/or meta-arrays.

Microphone arrays obtained by connecting multiple acoustic-electric transducers in series are known. Said microphone arrays may have different geometric shapes, such a three-dimensional shape (a spherical, cylindrical, tetrahedral or other shape) or a planar shape and may have different physical structures (rigid or flexible).

US2019/0379969A1 describes a planar microphone array, wherein the transducers are arranged in circular, radial, or random distributions, without addressing the problem of optimizing the beam-forming of the microphone array. The transducers of the array consist of digital transducers of MEMS (Micro Electro Mechanical Systems) type connected via an I2S bus. Such MEMS digital transducers are small and inexpensive, but they are impaired by connection problems. In fact, during the transmission of digital data, a critical problem of electromagnetic noise on the signals is often encountered, mainly due to the use of the I2S bus, since the I2S bus has the following problems:
- the I2S interface is designed to work with very small distances, in the order of a few centimeters at most;
- the power supply of the MEMS transducers must be provided by means of wires that are separate from the I2S bus;
- the capacity to share the same I2S interface over a certain number of MEMS transducers is limited (max. two), thus resulting in an unnecessarily complex wiring in case of large microphone arrays.

CN2010958793U describes a microphone unit comprising a PCB whereon transducers composed of MEMS capsules having A2B digital outputs are mounted. In addition, the transducers are randomly arranged on the PCB; therefore, such a microphone unit is not suitable for an optimal beam-forming of the signals from the transducers. Only one electrical connector is mounted on the PCB to connect the microphone unit, via electrical cable, to an external device. Therefore, having only one electrical connector, such a microphone unit cannot be connected to another microphone unit to create a meta-array of microphone units in a daisy-chain configuration.

CN2010518820U describes a microphone unit comprising a microphone array with transducers arranged circumferentially, in-line, or rectangularly, which operate with A2B bus or INICNET. However, such a microphone unit does not comprise a microphone in the center, or input and output connectors on the PCB of the microphone unit. Therefore, such a microphone unit cannot realize an optimal beam-forming and cannot be used to create a meta-array of microphone units in a daisy-chain configuration.

JPS6172500A describes a circular distribution of analog microphones, with a central microphone, for "circular conference table" application. Such a solution is not a transducer array, since the individual signals of the transducers are detected and processed individually, and not all together to realize a beam-forming. In fact, such a microphone distribution provides a single audio output signal, which is obtained by analog combination of the microphone signals. Therefore, such a solution is not capable of performing any beam-forming. Such a document does not describe a microphone unit comprising a transducer array on a PCB, but rather a multi-microphone system distributed within a room.

GB2545359A describes a device for capturing and outputting audio that is a stand-alone system composed of a circular array of analog microphones, specifically between 2 and 8 in number, plus a speaker. Thus, it is not a microphone unit comprising a PCB whereon transducers are mounted. Such a document does not mention interfaces or A2B buses, or electrical connectors on the PCB that allow for daisy-chain connection. Such a document accidentally mentions that a microphone might be arranged in central position, but does not describe any advantage in terms of beam-forming.

KR101403372B1 describes a microphone unit with an array of MEMS capsules arranged in a polygonal configuration of triangular, square, and regular pentagonal shape. The microphone unit provides for microphone capsules at the vertices of the polygon, plus a microphone capsule in the center, but no technical justification is provided on the presence of a capsule in the center and on how beam-forming is improved. Each microphone unit provides for a single connector, for connecting the microphone unit to a central control unit. Therefore, the microphone unit does not provide for input and output connectors. Therefore such a solution does not allow to connect the microphone units in a daisy-chain configuration to form a meta-array. In fact, the microphone units are connected in a star configuration to the central control unit, and not sequentially. Because of such a star connection, wiring is redundant, bulky, complex, expensive, and more prone to noise. Moreover, such a document does not mention an A2B bus, since the microphone units are connected to an external device, by means of analog signals, thus making the system intrinsically prone to noise and requiring the adoption of very short cables in order to limit the noise picked up.

DE102013019194A1 describes a plurality of PCBs, each one having only two analog microphone capsules with omnidirectional directivity. The combination of each pair of analog microphone capsules with omnidirectional directivity provides a single microphone signal with cardioid directivity. The PCBs are connected in series one after the other, via A2B bus, and are spaced apart inside a vehicle. Each pair of analog microphones captures the sound in the proximity of the point where the PCB is located. The individual PCBs do not interact with each other in any way. Therefore, they do not constitute a concentrated meta-array and they cannot be employed together for realizing a beam-forming.

The purpose of the present invention is to eliminate the drawbacks of the prior art by providing a microphone unit that is reliable, suitable for minimizing the noise on signals, optimizing the beam-forming of the single microphone unit, and being connected to other microphone units in a daisy-chain configuration, thus forming a meta-array suitable for being connected to a network having a host-processor configured to perform a beam-forming of the signals of the transducers of the microphone units of the meta-array.

It is another purpose of the present invention to provide such a microphone unit that is versatile and easy to be composed to realize a microphone meta-array.

Another scope of the present invention is to provide such a microphone unit or microphone meta-array that is versatile and usable in different types of applications, such as in the automotive industry, where a microphone meta-array may serve multiple positions (passengers) in the vehicle.

It is another purpose of the invention to provide such a microphone unit or microphone meta-array that is simple to make and install and is easily integrated in an A2B network.

These purposes are achieved in accordance with the invention with the microphone unit of the independent claim 1 and with the microphone meta-array obtained with said microphone units.

Advantageous embodiments of the invention appear from the dependent claims.

The microphone unit according to the invention is defined by claim 1.

In order to achieve significant advantages with respect to the microphone arrays of the prior art, the following problems have been solved in the design of the microphone unit according to the invention:

optimization of the position of the transducers in order to achieve a robust beam-forming (presence of a capsule in the center);

optimization of the shape of the microphone unit in order to simplify the creation of meta-arrays;

reliable and noise-free electrical interface between the microphone units (A2B bus);

practical, simple and inexpensive electrical connection system between the microphone units (UTP cable).

The microphone unit according to the invention is characterized by an optimal distribution of the transducers on a single PCB comprising a central transducer and at least three peripheral transducers arranged at the same radial distance from the central transducer and angularly equidistant from each other. The use of a centrally located transducer is paramount because it provides a very robust beam-forming.

The transducers of a microphone unit are connected to an A2B interface. In this way the microphone units can be connected in cascade (daisy-chain configuration), via an A2B digital bus using a simple unshielded twisted pair (UTP cable) in such a way to obtain a microphone meta-array.

By means of the A2B digital bus, it is possible to transmit a large number of channels through a single twisted pair, with a very low latency and a transmission that is particularly robust to noise.

Advantageously, the distribution of the transducers in a microphone unit can have the shape of an equilateral triangle, wherein the central transducer is arranged in the center of the triangle and the peripheral transducers are arranged at the vertices of the triangle. Similarly, the PCB of the microphone unit is shaped like an equilateral triangle that circumscribes the transducers.

Such a triangular shape of the microphone unit allows for making larger microphone meta-arrays without geometric limitations, while keeping the overall distribution of transducers as uniform as possible. The flexibility of use of such triangular microphone units allows for assembling an unlimited number of geometries for microphone arrays, which can be reconfigured in a few minutes and always reusing the same microphone units.

Additional features of the invention will be manifest from the following detailed description, which refers to merely illustrative, not limiting embodiments, as shown in the appended figures, wherein.

Figure 1:
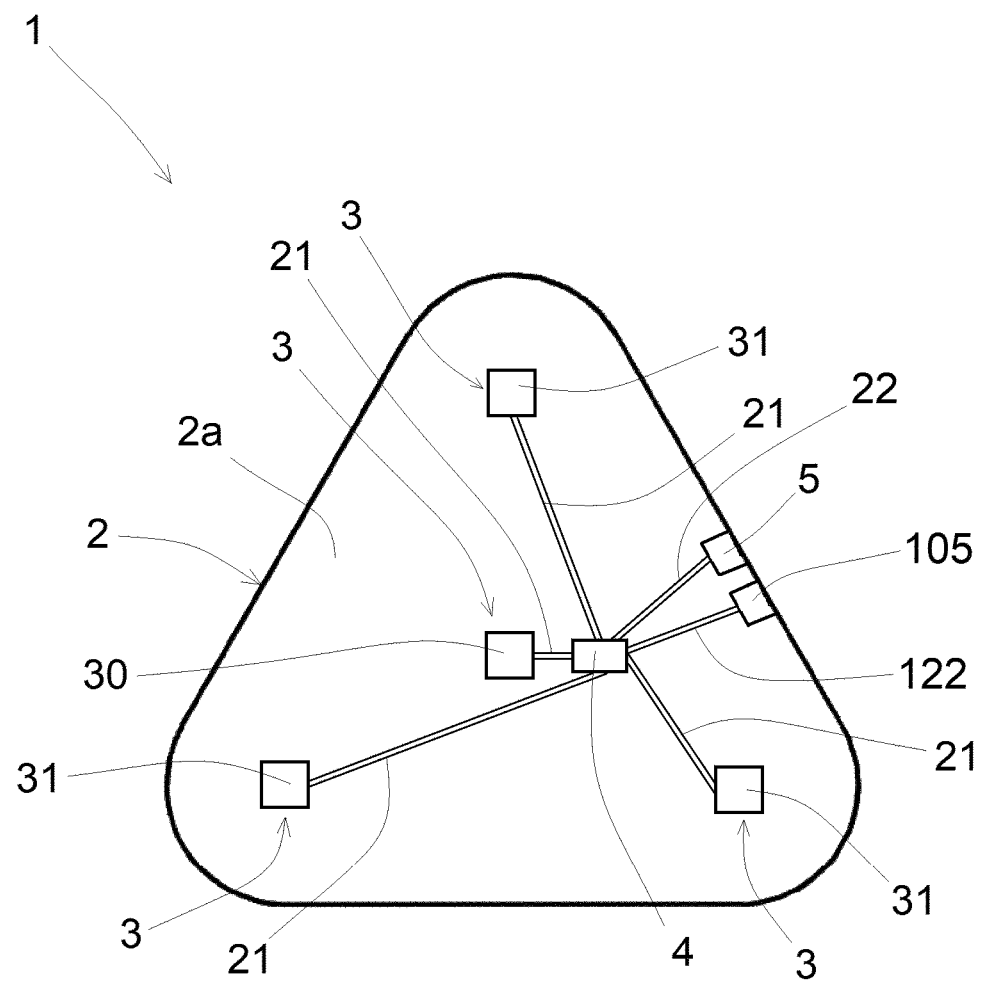
FIG. 1 is a view illustrating a back side of a microphone unit according to the invention having a planar triangular shape.
Figures 6A, 6B, 6C:
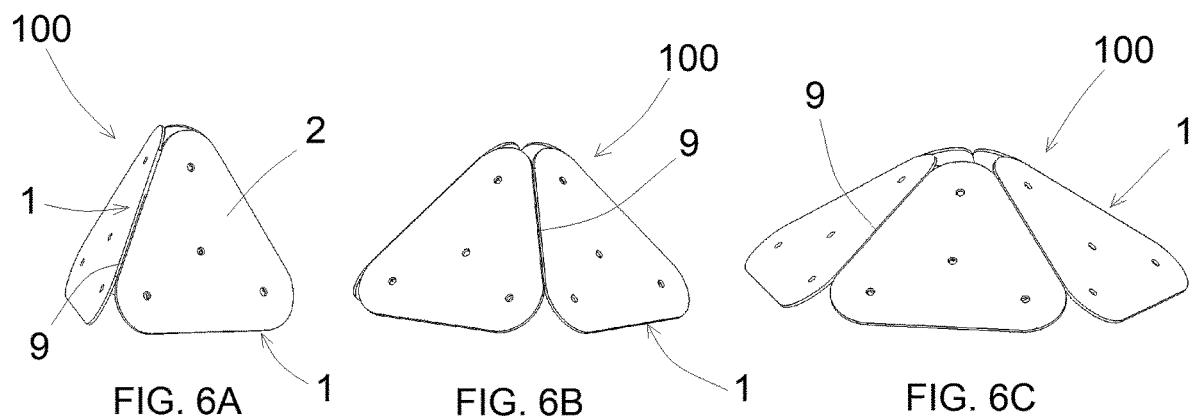
Figure 7:
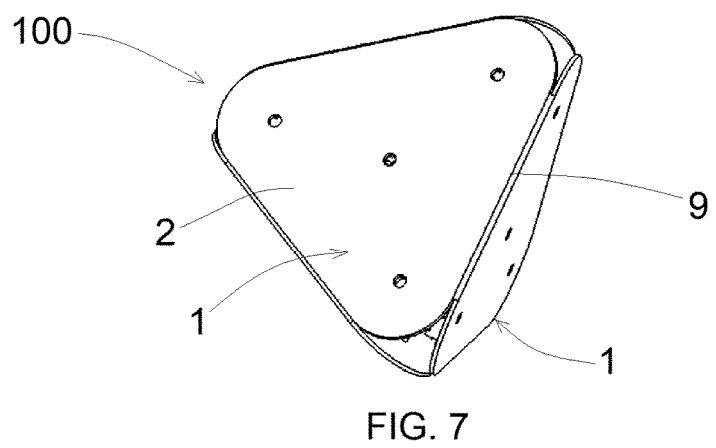
Figure 8:
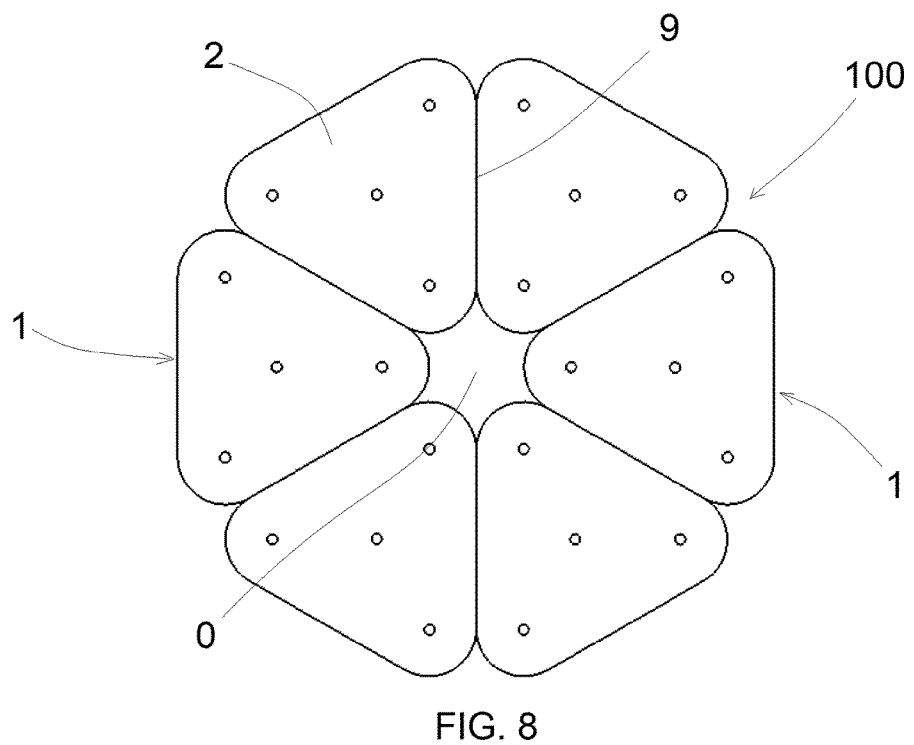
Figure 9:
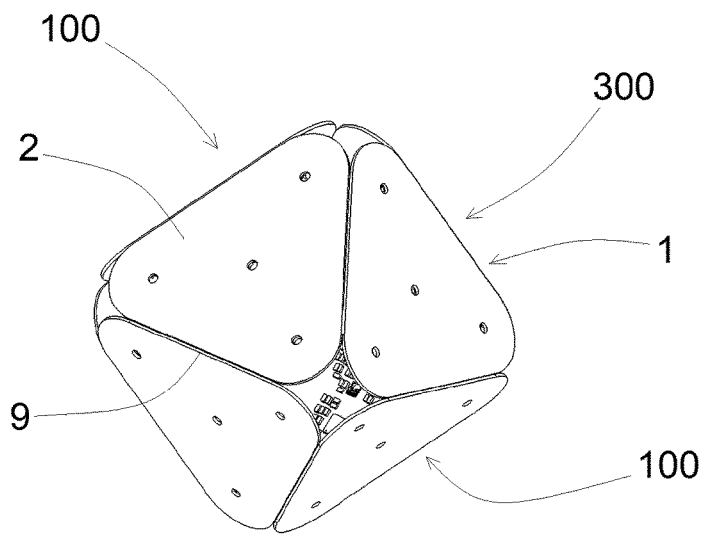
Figures 10A, 10B:
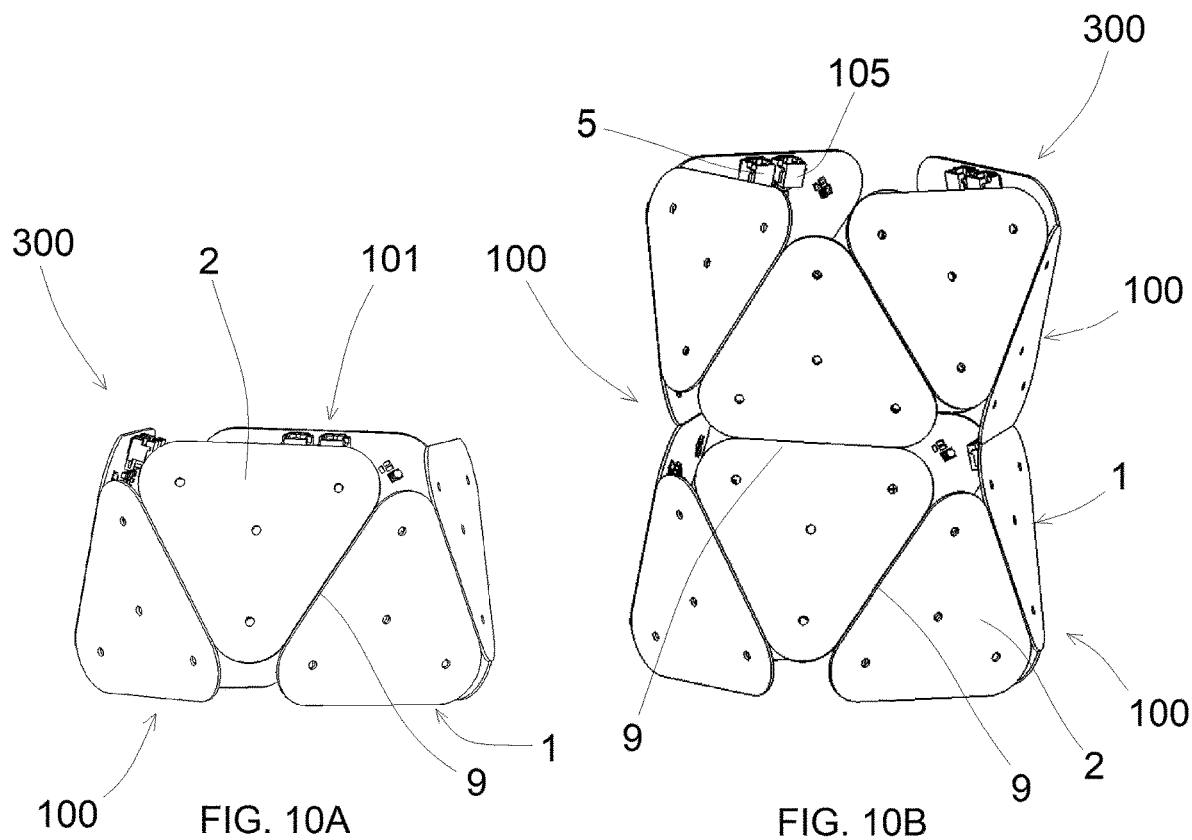
Figure 11:
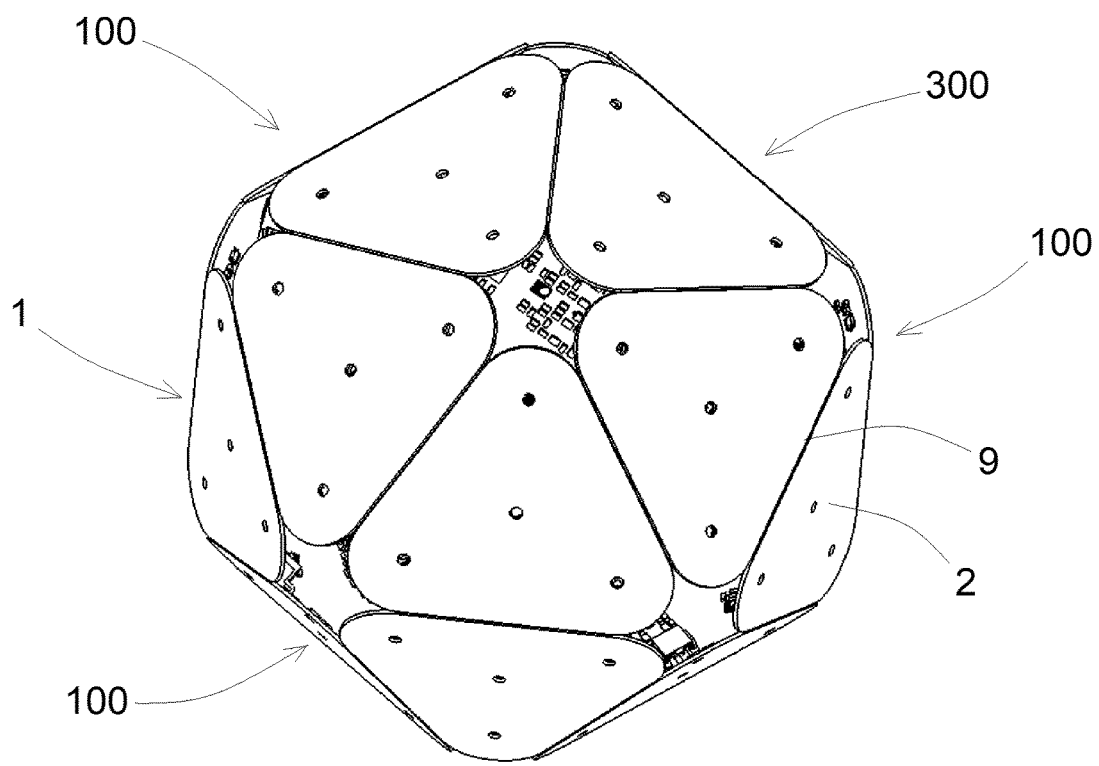
Figure 12:
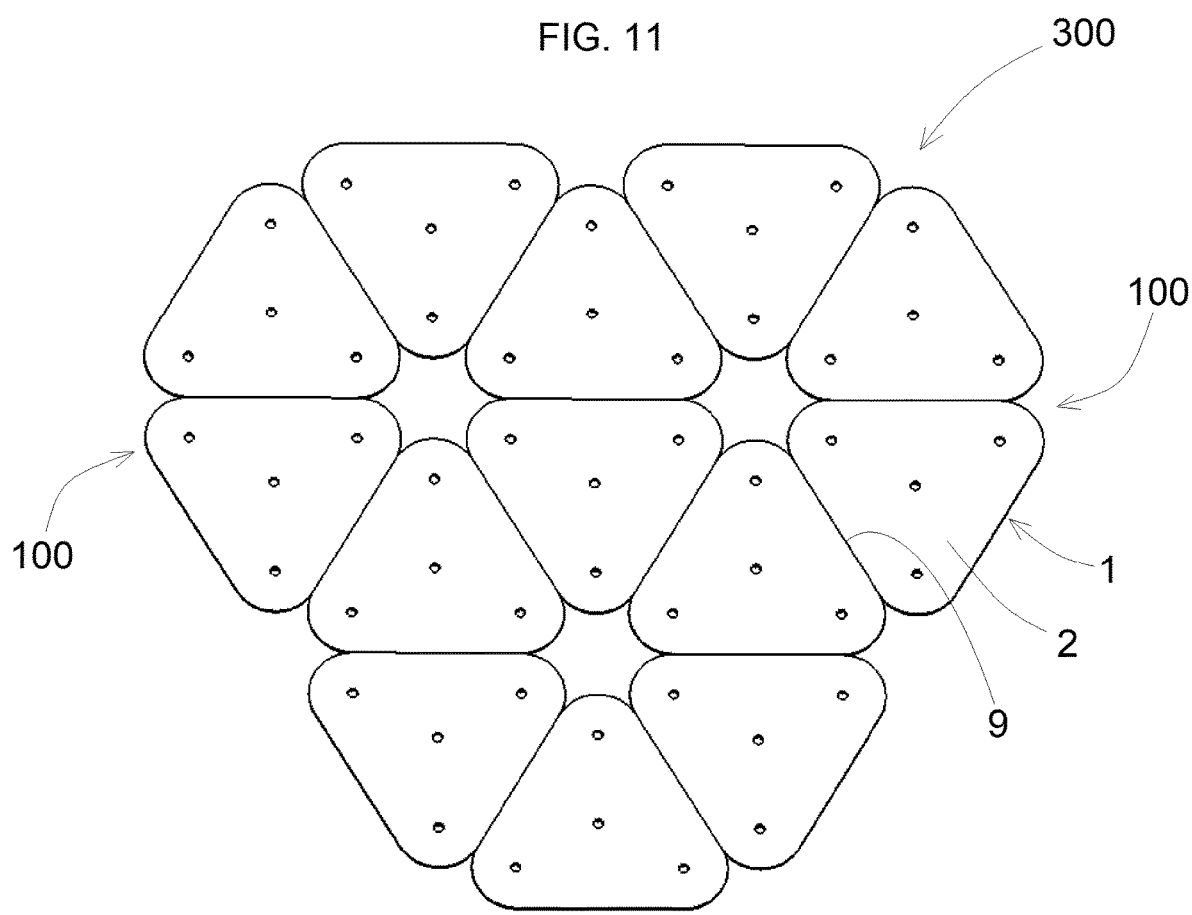

FIGS. 6A, 6B, and 6C are three perspective views of three-dimensional, dome-shaped microphone meta-arrays, respectively obtained with 3, 4, and 5 triangular microphone units of FIG. 1;

FIG. 7 is a perspective view of a tetrahedral microphone meta-array comprising 4 triangular microphone units of FIG. 1;

FIG. 8 is a view of a planar microphone meta-array comprising 6 triangular microphone units of FIG. 1;

FIG. 9 is a perspective view of an octahedral microphone meta-array comprising 8 triangular microphone units of FIG. 1;

FIGS. 10A and 10B are two perspective views illustrating two examples of cylindrical microphone meta-arrays, respectively comprising 8 and 16 triangular microphone units of FIG. 1;

FIG. 11 is a perspective view of an icosahedral microphone meta-array comprising 20 triangular microphone units of FIG. 1; and FIG. 12 is a view of a planar microphone meta-array comprising 13 triangular microphone units of FIG. 1.

Figure 1A:
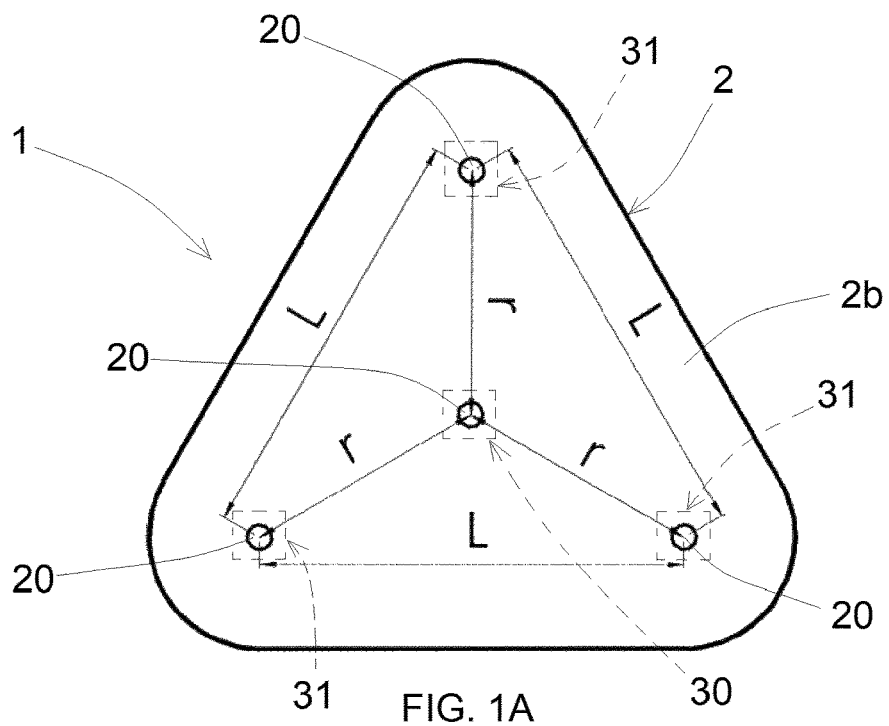
FIG. 1A is a view illustrating a back side of the microphone unit of FIG. 1.

With reference to FIGS. 1 and 1A, a triangular microphone unit according to the invention is disclosed, which is generally indicated with reference numeral 1.

The microphone unit (1) comprises a PCB (2) and a plurality of transducers (3) mounted on the PCB.

The PCB (2) is a rigid planar PCB and has a front side (2b) (FIG. 1A) suitable for facing a sound source, and a back side (2a) (FIG. 1) wherein the transducers (3) are mounted.

Through holes (20) are cut in the PCB (2) in correspondence with each transducer (3) in such a way that the acoustic waves emitted from the sound source pass through the PCB (2) and hit the transducers (3).

Each transducer (3) is an acoustic-electric transducer and has a digital output; that is to say, the transducer (3) is suitable for converting a sound signal into an electrical signal of digital type.

Each transducer (3) consists of a MEMS (Micro Electro Mechanical Systems) capsule that provides a good cost/performance ratio and a long-term stability. The MEMS capsule has a digital output, for example of PDM (Pulse Density Modulation) type.

Advantageously, the digital outputs of the transducers (3) are connected to an A2B audio interface (4) by means of respective tracks (21) of the PCB (2). The audio interface A2B (B) is a transceiver suitable for receiving the digital signal of the transducers (3) and converting said digital signal into a suitable format for being sent in an A2B audio bus having substantial advantages in terms of noise immunity even in long connections and of connection reliability.

The A2B audio interface (4) is connected to an electrical input connector (5) and an electrical output connector (105) by means of respective tracks (22; 122) of the PCB (2). The electrical connectors (5; 105) are suitable for connecting an A2B audio bus that uses a simple twisted pair (UTP cable).

The plurality of transducers (3) comprises a central transducer (30) and at least three peripheral transducers (31)

arranged at the same radial distance (r) from the central transducer (30) and equally angularly spaced. In this way a peripheral transducer is spaced from the two nearest peripheral transducers by the same distance (L).

FIGS. 1 and 1A illustrate a triangular arrangement of four transducers (3), wherein the central transducer (30) is arranged at the center of an equilateral triangle and the peripheral transducers (31) are arranged at the three vertices of the equilateral triangle, so that the three peripheral transducers (31) are equally spaced by an angle of 120°, i.e. one peripheral transducer is spaced from the two nearest peripheral transducers by the same distance (L) that is equal to the side of the equilateral triangle. In such a case, the PCB (2) has a triangular shape in order to circumscribe the triangular arrangement of the transducers as efficiently as possible.

The transducers (3), the A2B audio interface (4), and the electrical connectors (5; 105) are mounted on the back side (2a) of the PCB. Therefore, the front side (2b) of the PCB, that is the one that will face the sound field, is perfectly flat, smooth and free from any obstacle. This is a very important acoustic feature, especially when large planar microphone meta-arrays with many microphone units arranged side by side are to be realized.

The microphone unit (1) may have a number of transducers (3) higher than four, disposed in a regular polygon arrangement, wherein the central transducer (30) is arranged at the geometric center of the regular polygon and the peripheral transducers (31) are arranged at the vertices of the regular polygon.

Figure 2A:
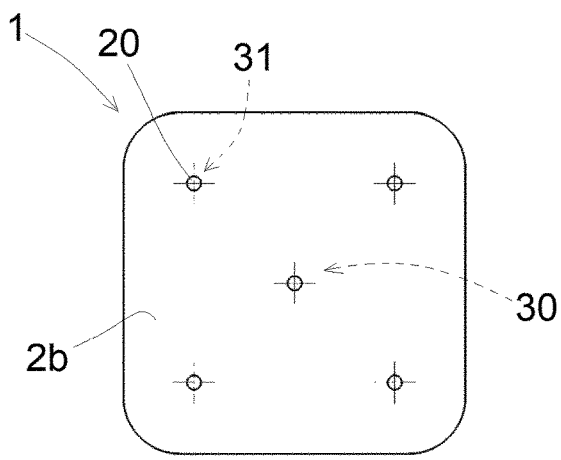
FIGS. 2A, 2B, 2C and 2D are views illustrating the front faces of four different embodiments of microphone units according to the present invention, respectively having a square, pentagonal, hexagonal and circular shape.

FIG. 2A illustrates a square arrangement of five transducers (3), wherein the central transducer (30) is arranged at the center of a square and the peripheral transducers (31) are arranged at the four vertices of the square, so that the four peripheral transducers (31) are angularly equidistant by an angle of 90°. In such a case, the PCB (2) has a square shape.

Figure 2B:
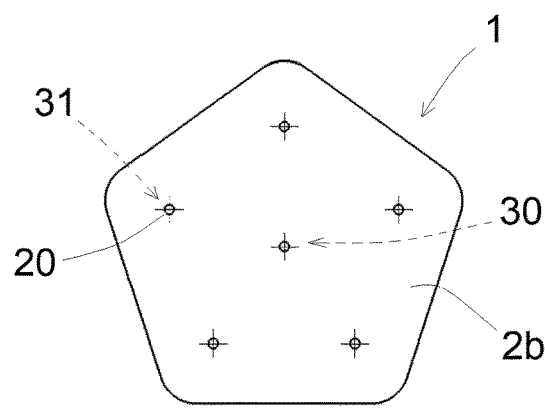

FIG. 2B illustrates a pentagonal arrangement of six transducers (3), wherein the central transducer (30) is arranged at the center of a pentagon and the peripheral transducers (31) are arranged at the five vertices of the pentagon, so that the five peripheral transducers (31) are angularly equidistant by an angle of 72°. In such a case, the PCB (2) has a pentagonal shape.

Figure 2C:
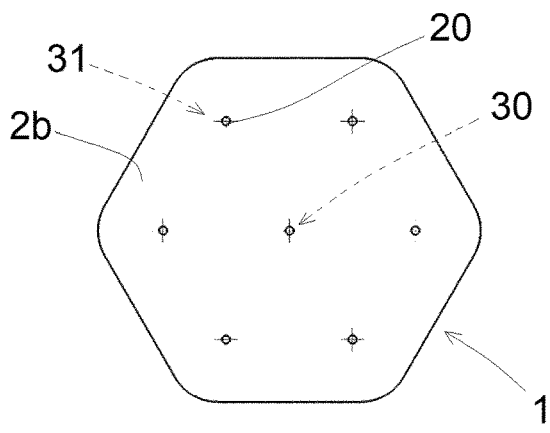

FIG. 2C illustrates a hexagonal arrangement of seven transducers (3), wherein the central transducer (30) is arranged at the center of a hexagon and the peripheral transducers (31) are arranged at the six vertices of the hexagon, so that the six peripheral transducers (31) are angularly equidistant by an angle of 60°. In such a case, the PCB (2) has a hexagonal shape.

Similarly, arrangements of transducers and shapes of the PCB can be provided according to regular polygons with more than six sides.

Figure 2D:
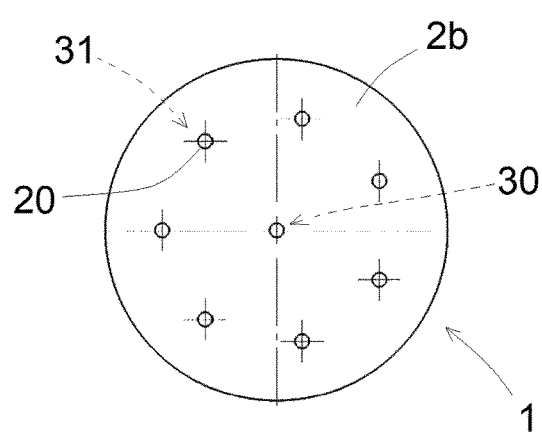

FIG. 2D illustrates a heptagonal arrangement of eight transducers (3), wherein the central transducer (30) is arranged at the center of a heptagon and the peripheral transducers (31) are angularly equidistant by an angle of 51.4° at the seven vertices of the heptagon, so that the seven peripheral transducers (31) are angularly equidistant by an angle 51.4°. In such a case, the PCB (2) has a circular shape.

Obviously, when the transducers are arranged according to a regular polygon, the PCB (2) can always have a circular shape that circumscribes the polygon.

The central transducer (30) is used as a reference microphone and provides a very robust beam-forming.

The A2B audio interface (4) allows to obtain an audio signal in a particularly robust and effective digital format, which can be transmitted even at great distances (over 40 m), with a high noise rejection capability and a latency reduced to only 50 μs.

Figure 3:
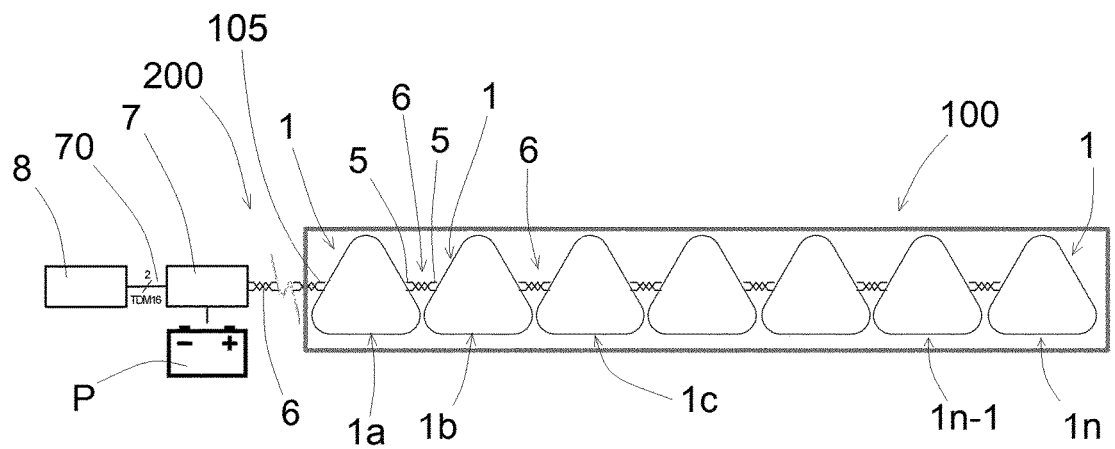
FIG. 3 is an electric diagram illustrating an A2B network comprising an A2B master connected to a microphone meta-array with seven microphone units.

With reference to FIG. 3, each microphone unit (1) can be connected to another microphone unit (1) by means of an A2B bus (6) in such a way to obtain a microphone meta-array (100) comprising a plurality of microphone units (1) connected in cascade. In view of the above, an open daisy-chain comprising a first microphone unit (1a) and a last microphone unit (1n) is obtained. The bus A2B (6) consists of a twisted pair and is suitable for carrying both the digital signal detected by the transducers (3) and the power supply of the microphone units (1).

A certain number of microphone units can be connected on the same bus A2B (6); in particular, a maximum of seven microphone units (1) with 4 channels each. The first microphone unit (1a) is connected to an A2B master (7) on one side and to the next microphone unit (1b) on the other side; each intermediate microphone unit (1b, 1c, 1d ... 1n−1) is connected between two microphone units, i.e. the previous and the following microphone units, whereas the last microphone unit (1n) is connected to the previous microphone unit only (1n−1).

The A2B bus (6) that connects two adjacent microphone units (1) can have a maximum length of 15 meters. The A2B bus (6) carries both the digital audio signal and the power supply. The A2B bus (6) has terminals made up of conductors inserted in the electrical connectors (5; 105) of the microphone units. The electrical connectors (5; 105) of the microphone units are inexpensive and simple to assemble.

The microphone meta-array (100) can be integrated in an A2B network (200), wherein the first microphone unit (1a) of the microphone meta-array is connected to an A2B master (7) that manages all microphone units (1) of the microphone meta-array; therefore, all microphone units (1) of the microphone meta-array operate as slaves in the network. The first microphone unit (1a) is connected to the A2B master (7) by means of an A2B bus (6).

The A2B master (7) provides a digital clock for all signals in the network, in order to keep the operation of the transducers (3) of the microphone units (1) perfectly synchronous. The A2B master (7) can receive up to 28 signals from the microphone units.

The A2B master (7) is connected to a power supply (P) in order to power all microphone units.

The A2B master (7) is connected to a host-processor (8) by means of two digital interfaces (70) of TDM-16 type.

It must be considered that the A2B master (7) can manage a certain number of slave units depending on the network configuration; therefore, in the case of microphone units (1) with four microphones each, the microphone meta-array (100) can comprise a maximum of seven microphone units (1).

If the host-processor (8) has more than two incoming TDM-16 interfaces, multiple A2B masters (7) can be used and consequently one or more microphone meta-arrays (100) with a higher number of microphone units (1) connected.

The acoustic signals detected by the transducers (3) of each microphone unit (1) are sent in digital synchronous format to the master A2B (7) which sends them to the host-processor (8). Then, the signals received by the host-processor (8) are synchronously acquired and analyzed by the host-processor (8) which is configured to process said signals to obtain a beam-forming of said signals by means of any beam-forming algorithm (e.g. "regularized Kirkeby inversion" or "MVDR—minimum variance distortionless response").

Figure 4:
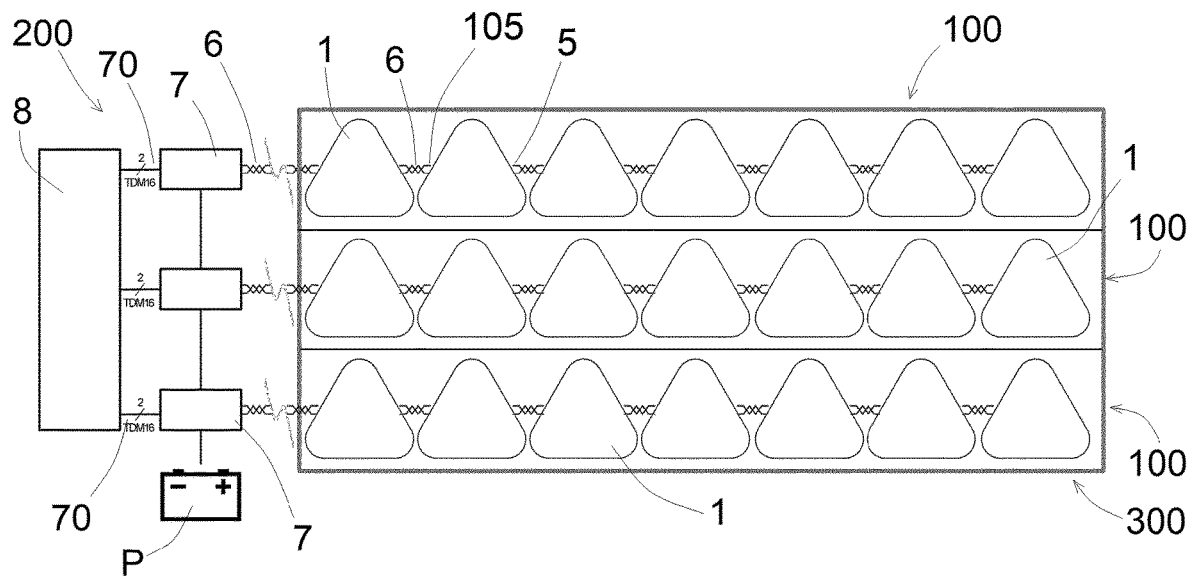
FIG. 4 is an electric diagram illustrating an A2B network, comprising three A2B masters with a total of 21 microphone units organized in one or more meta-arrays.

FIG. 4 illustrates an A2B network (300), wherein three A2B masters (7) are connected to the host-processor (8). Each A2B master (7) is connected to a microphone meta-array (100). In such a case, being part of the same network (200), the three microphone meta-arrays (100) can be physically combined in close arrangements, in such a way to obtain a microphone group (300) comprising several microphone meta-arrays that are part of the same network or a single microphone meta-array that comprises all microphone units (1).

If each microphone meta-array (100) has seven microphone units (1) comprising 4 transducers (3), the network (200) of FIG. 4 comprises 84 transducers (3), resulting in a very accurate reconstruction of the sound signal with a minimum volume.

It is evident that reliable microphone meta-array networks with flexible wiring and assembly can be realized. There is no need for rigid connections between the microphone units (1), which can be positioned freely, even in a large space and therefore covering a large volume, or can be arranged in any configuration of the microphone meta-array (100), which is optimized according to its purpose.

It is not necessary to adopt any predefined geometry in order to realize the microphone meta-array (100). However, some particular geometries of the microphone meta-array (100) may be optimal to improve its acoustic performance.

To obtain a meta-array, the microphone units (1) must be electrically connected by means of the A2B buses (6). To obtain a compact microphone meta-array, the PCBs (2) of the microphone units can be arranged in adjacent position and connected by soldering or held together using rigid or flexible connectors.

The flexible wiring by means of the A2B bus (6) allows to cover the surface of any object, such as a machinery, a vehicle, a human body or a wall, with microphone units (1). Such a flexibility of use can be exploited in a variety of ways:
- the microphone units (1) can be used alone, placing them inside or outside objects and bodies, such as apparel, hats, and other clothing accessories;
- a number of microphone units (1) can be placed in a large space, so that each microphone unit (1) captures the sound coming from a specific direction;
- a number of microphone units (1) can be used to realize any type of microphone array, such as a planar, cylindrical, spherical, or dome-shaped array, with various size and number of transducers.

Figure 5:
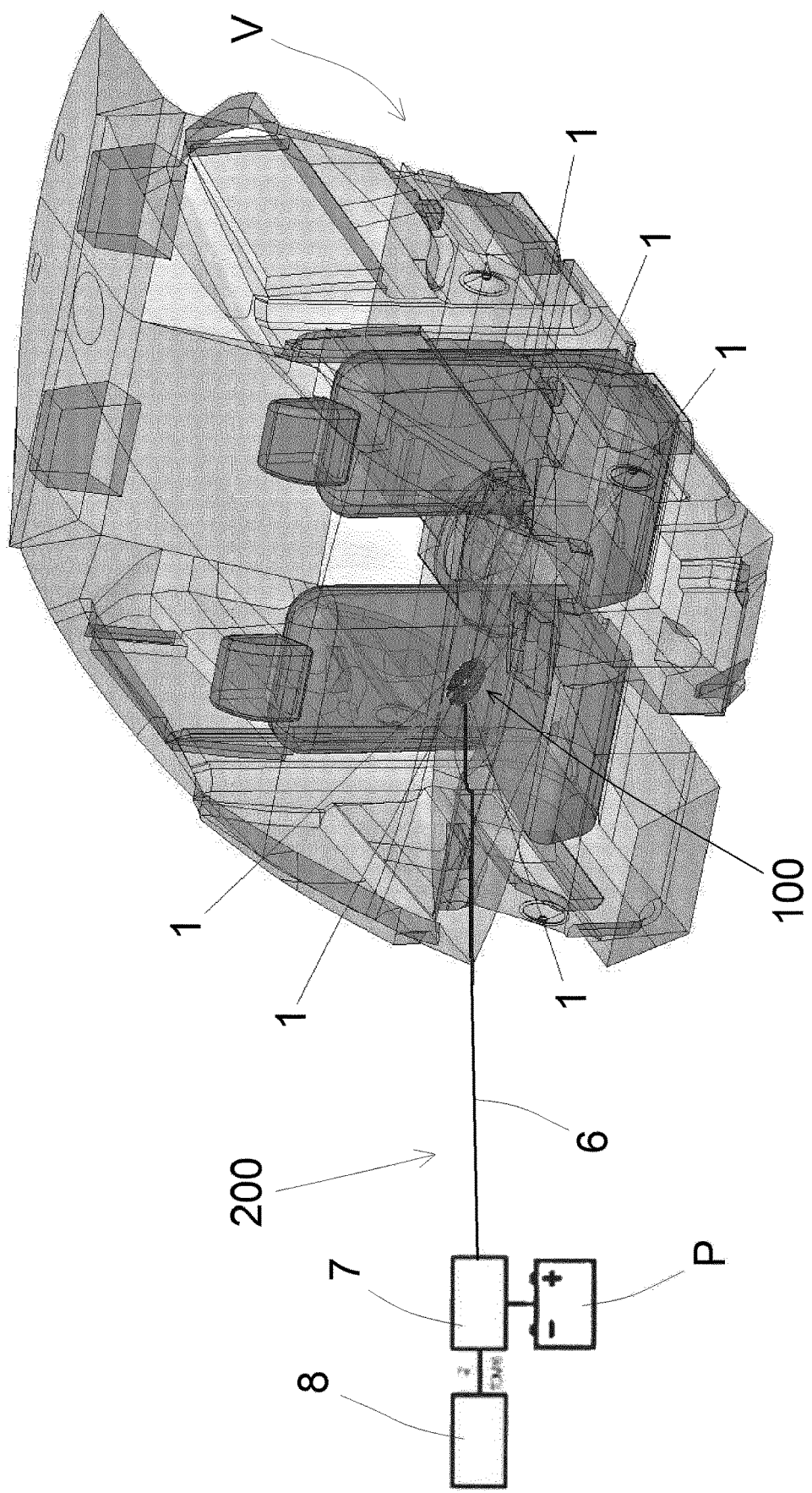
FIG. 5 is a perspective view diagrammatically illustrating a vehicle wherein a meta-array with multiple microphone units is installed and connected to an A2B network, such as the one of FIG. 3 or 4.

FIG. 5 illustrates a vehicle (V) wherein a microphone meta-array (100) of compact type is installed, said microphone meta-array (100) comprising a plurality of microphone units (1) connected in cascade by means of an A2B bus (6). The microphone meta-array (100) is part of an A2B network (200), wherein the first microphonic unit is connected to the A2B master (7) which in turn is connected to the host-processor (8).

The beam-forming performed by the host-processor (8) on the signals coming from the transducers (3) of the microphone units (1) of the microphone meta-array (100) enhances the sound coming from a specific direction and rejects the sound coming from other directions. This is especially useful in different applications, such as handsfree communication, ILZ (Individualized Listening Zone) or ANC (Active Noise Cancellation).

FIGS. 6A, 6B, and 6C illustrate three different layouts of dome-shaped microphone meta-arrays (100), respectively comprising 3, 4, and 5 triangular microphone units, and therefore 12, 16, and 20 transducers (3). The lateral edges of the PCBs (2) are fixed by means of fixing means (9), such as soldering, gluing, interlocking, connectors and the like, so as to obtain a pyramid with a triangular, square, pentagonal base, respectively.

In such a case, since the number of microphone units (1) is lower than seven, the microphone meta-array (100) can be inserted in an A2B network (200) having only one A2B master, such as the one illustrated in FIG. 3. The dome-shaped configurations of the microphone meta-array are particularly interesting for video conferencing applications, i.e., when the microphone array must be positioned in the center of a table and the virtual microphones obtained by means of the beam-forming are directed towards the participants' mouths.

FIG. 7 illustrates a three-dimensional microphone meta-array (100) with 4 triangular microphone units (1) and 16 transducers (3). The lateral edges of the PCBs (2) of the microphone units fixed by means of fixing means (9) so as to obtain a regular tetrahedron. In this case, since the number of microphone units (1) is less than seven, the microphone meta-array (100) can be inserted into an A2B network (200) having only one A2B master, such as that illustrated in FIG. 3.

The regular tetrahedron geometry is typical of the microphone arrays of the prior art, which only comprise four transducers arranged at the vertices of the tetrahedron. Instead, the microphone meta-array (100) of FIG. 7 comprises four triangular microphone units, one on each side, each microphone unit being provided with four transducers, and therefore the performance of such a solution is significantly higher than the tetrahedron microphone arrays of the prior art.

FIG. 8 illustrates a planar microphone meta-array (100) comprising six triangular microphone units (1) and 24 transducers (3). The lateral edges of the PCBs (2) of the microphone units are fixed by means of fixing means (9). Such a geometry is preferred when the spatial information is enclosed in a semi-space. In this case, since the number of microphone units (1) is lower than seven, the microphone meta-array (100) can be inserted in an A2B network (200) having only one A2B master, such as the one illustrated in FIG. 3.

FIG. 9 illustrates a three-dimensional microphone meta-array (100) comprising eight triangular microphone units (1) for a total of 32 transducers. The lateral edges of the PCBs (2) of the microphone units are fixed by means of fixing means (9) so as to obtain a regular octahedron.

In such a case, since the number of microphone units (1) is higher than seven, it is necessary to use an A2B network (200) with two masters (7), such as the one illustrated in FIG. 4.

Regular octahedron microphone arrays comprising only eight transducers arranged at the vertices of the octahedron are known. Instead, the microphone meta-array (100) of FIG. 9 comprises eight triangular microphone units, one on each side, each microphone unit being provided with four transducers, and therefore the performance of such a solution is significantly higher than the octahedron microphone arrays of the prior art.

FIGS. 10A and 10B illustrate two cylindrical microphonic meta-arrays (300).

The microphone meta-array (300) of FIG. 10A comprises eight triangular microphone units (1) with a total of 32 transducers. The lateral edges of the PCBs (2) of the microphone units are fixed by means of fixing means (9) so as to obtain a substantially cylindrical shape. In such a case, since the number of microphone units (1) is higher than seven, it is necessary to use an A2B network (200) with two A2B masters (7), such as the one illustrated in FIG. 4. The microphone meta-array (300) of FIG. 10B comprises 16 microphone units (1) with a total of 64 transducers. In such a case, since the number of microphone units (1) is higher than 14, it is necessary to use an A2B network (200) with three A2B masters (7), such as the one illustrated in FIG. 4.

Said cylindrical microphone arrays are particularly useful when the spatial information is located primarily in one plane and the sound coming from above and from below is less relevant.

FIG. 11 illustrates a three-dimensional microphone meta-array (300) comprising 20 triangular microphone units (1) with a total of 80 transducers.

The lateral edges of the PCBs (2) of the microphone units are fixed by means of fixing means (9) so as to obtain a regular icosahedron.

In such a case, since the number of microphone units (1) is higher than 14, it is necessary to use an A2B network (200) with three A2B masters (7), such as the one illustrated in FIG. 4.

FIG. 12 illustrates a planar microphone meta-array (300) comprising 13 triangular microphone units (1) for a total of 52 transducers. The lateral edges of the PCBs (2) of the microphone units are fixed by means of fixing means (9).

In such a case, since the number of microphone units (1) is comprised between 7 and 14, it is necessary to use an A2B network (200) with two A2B masters (7), such as the one illustrated in FIG. 4.

Such a microphonic meta-array (300) can be used when the spatial information is enclosed in a semi-space, like the microphonic meta-array (100) of FIG. 8, but obviously the microphone meta-array (300) of FIG. 12 has a much higher performance than the microphone meta-array (100) of FIG. 8 because the number of transducers (3) is more than doubled.

The invention claimed is:

1. Microphone unit comprising:
   only one PCB with a front side suitable for being directed towards a sound source and a back side;
   a plurality of transducers mounted on said back side of the PCB, each transducer being of acoustic-electric type with digital output, suitable for converting a sound signal into an electrical signal of digital type;
   through holes obtained in the PCB in correspondence of each transducer in such a way that acoustic waves emitted by the sound source pass through the PCB and hit the transducers;
   electrically connected to said transducers, said A2B audio interface being a transceiver suitable for receiving the digital signal from the transducers and convert said digital signal into an A2B format suitable for being sent in an A2B audio bus; and
   an input electrical connector and an output electrical connector mounted on said back side of the PCB and electrically connected to said A2B audio interface, said input and output electrical connectors being suitable for connecting respective A2B audio buses that use a single twisted pair, so that said microphone unit can be connected to one or two adjacent microphone units, in a daisy-chain configuration, forming a meta-array suitable for being connected to a A2B network having a host processor configured to perform a beam-forming of signals from all the transducers of the microphonic units of the meta-array;
   wherein said plurality of transducers of a single microphone unit comprises a central transducer and at least three peripheral transducers disposed at the same radial distance from the central transducer and equally angularly spaced.

2. The microphone unit of claim 1, wherein said transducers are electrically connected to said A2B audio interface by means of tracks of the PCB and said input and output electrical connectors are electrically connected to said A2B audio interface by means of a track of the PCB.

3. The microphone unit of claim 1, wherein each transducer is composed of a MEMS (Micro Electro Mechanical Systems) capsule.

4. The microphone unit of claim 1, comprising four transducers in equilateral triangle arrangement, wherein the central transducer is disposed in the center of the equilateral triangle and the peripheral transducers are disposed in correspondence of the three vertices of the equilateral triangle.

5. The microphone unit of claim 4, wherein the PCB has a triangular shape that circumscribes the equilateral triangle arrangement of the transducers.

6. The microphone unit of claim 1, comprising more than four transducers disposed in regular polygon arrangement, wherein the central transducer is disposed in the center of the regular polygon and the peripheral transducers are disposed in correspondence of the vertices of the regular polygon.

7. The microphone unit of claim 6, wherein the PCB has the shape of a regular polygon or of a circle that circumscribes the regular polygon arrangement of the transducers.

8. Microphone meta-array comprising a plurality of microphone units according to claim 1 that are electrically connected in cascade in a daisy chain configuration by means of an A2B audio bus that uses a twisted pair; wherein said meta-array is suitable for being connected to a A2B network having a host processor configured to perform a beam-forming of signals from all the transducers of the microphonic units of the meta-array.

9. The microphone meta-array of claim 8, wherein the PCBs of the microphone units have lateral edges that are mutually fixed by means of fixing means in such a way to obtain a compact meta-array having a planar two-dimensional or three-dimensional shape.

10. A2B network comprising:
   at least one microphone meta-array according to claim 8;
   at least one A2B master connected to a first microphone unit of said microphone meta-array by means of an A2B bus and configured in such a way to control all the microphone units of said microphone meta-array and to synchronize signals coming from said transducers of all microphone units;
   an electrical power supply connected to said A2B master to power the microphone units of the microphone meta-array; and
   a host processor connected to said master A2B and configured for performing a beam-forming of signals from all the transducers of the microphone units of the meta-array.

11. Vehicle comprising an A2B network according to claim 10, wherein said microphone meta-array is arranged on board of the vehicle.

* * * * *